United States Patent Office 3,028,365
Patented Apr. 3, 1962

3,028,365
THERMOPLASTIC AROMATIC POLYCARBONATES AND THEIR MANUFACTURE
Hermann Schnell, Ludwig Bottenbruch, and Heinrich Krimm, Krefeld-Uerdingen, Germany, assignors to Farbenfabriken Bayer Aktiengesellschaft, Leverkusen, Germany, a corporation of Germany
No Drawing. Filed Oct. 12, 1954, Ser. No. 461,938
Claims priority, application Germany Oct. 16, 1953
40 Claims. (Cl. 260—47)

It is known to produce thermoplastic materials by re-esterification of dialkyl carbonates with glycols. The products obtained have no technical importance on account of their low softening point.

Polycarbonates have also been produced by converting polyfunctional phenols, which carry several hydroxyl groups on an aromatic nucleus, such as hydroquinol and resorcinol, with phosgene. The polycarbonates obtained in this manner are however insoluble in customary solvents and decompose at their melting temperatures.

The properties of the products prepared according to the processes described render them practically unimportant as plastics.

According to the present invention thermoplastic polyesters exhibiting valuable technical properties are obtained. These polyesters are polycarbonates of di-(monohydroxyaryl)-alkanes, especially of di-(monohydroxyaryl)-methanes and particularly of 4,4'-dihydroxydiarylmethanes.

The process for the manufacture of the new polyesters comprises reacting di-(monohydroxyaryl)-alkanes with derivatives of the carbonic acid selected from the group consisting of carbonic acid diesters, phosgene and bis-chloro-carbonic acid esters of di-(monohydroxyaryl)-alkanes.

The two aryl residues of the di-(monohydroxyaryl)-alkanes applied according to the invention can be alike or different. The aryl residues can also carry substituents which are not capable of reacting in the conversion into polycarbonates, such as halogen atoms or alkyl groups, for example, the methyl, ethyl, propyl or tert. butyl group. The alkyl residue of the di-(monohydroxyaryl)-alkanes linking the two benzene rings can be an open chain or a cycloaliphatic ring and may be substituted, if desired, for example by an aryl residue.

Suitable di-(monohydroxyaryl)-alkanes are for example (4,4'-dihydroxy-diphenyl)-methane, 2,2-(4,4'-dihydroxy-diphenyl)-propane, 1,1-(4,4'-dihydroxy-diphenyl)-cyclohexane, 1,1-(4,4'-dihydroxy - 3,3' - dimethyl-diphenyl)-cyclohexane, 1,1-(2,2'-dihydroxy-4,4'-dimethyl-diphenyl)-butane, (boiling point: 185–188° C. under 0.5 mm. mercury gauge) 2,2-(2,2'-dihydroxy-4,4'-di-tert.-butyl-diphenyl)-propane or 1,1'-(4,4'-dihydroxy-diphenyl)-1-phenyl-ethane, furthermore methane derivatives which carry besides two hydroxyaryl groups an alkyl residue with at least two carbon atoms and a second alkyl residue with one or more carbon atoms, such as 2,2-(4,4'-dihydroxy-diphenyl)-butane, 2,2-(4,4'-dihydroxy-diphenyl)-pentane (melting point 149–150° C.), 3,3-(4,4'-dihydroxy-diphenyl)-pentane, 2,2-(4,4'-dihydroxy-diphenyl)-hexane, 3,3-(4,4'-dihydroxy-diphenyl)-hexane, 2,2-(4,4' - dihydroxy - diphenyl)-4-methyl - pentane (melting point 151–152° C.), 2,2-(4,4'-dihydroxy-diphenyl)-heptane (boiling point 198–200° C. under 0.3 mm. mercury gauge), 4,4-(4,4'-dihydroxy-diphenyl)-heptane (melting point 148–149° C.), or 2,2-(4,4'-dihydroxy-diphenyl)-tridecane. Suitable di-(monohydroxyaryl)-alkanes the two aryl residues of which are different are for example 2,2-(4,4'-dihydroxy-3'-methyl-diphenyl)-propane and 2,2-(4,4' - dihydroxy-3-methyl-3'-isopropyl-diphenyl)-butane. Suitable di-(monohydroxyaryl)-alkanes the aryl residues of which carry halogen atoms are for instance 2,2-(3,5,3',5' - tetra-chloro - 4,4' - dihydroxy-diphenyl)-propane, 2,2-(3,5-3',5'-tetrabromo-4,4'-dihydroxy-diphenyl)-propane, (3,3'-dichloro-4,4'-dihydroxy-diphenyl)-methane and 2,2' - dihydroxy - 5,5' - difluoro - diphenyl-methane. Suitable di-(monohydroxyaryl)-alkanes the alkyl residue of which linking the two benzene rings is substituted by an aryl residue are for instance (4,4'-dihydroxy-diphenyl)-phenyl-methane and 1,1-(4,4'-dihydroxy-diphenyl)-1-phenyl-ethane. These compounds can be produced in known manner. Most of the compounds mentioned above are already known, those not yet known are characterised by the boiling or melting point.

In order to obtain special properties, mixtures of various di-(monohydroxyaryl)-alkanes can also be used, thus mixed polycarbonates are obtained.

The conversion of the aforesaid di-(monohydroxyaryl)-alkanes into high molecular polycarbonates by reacting with the mentioned derivatives of the carbonic acid may be carried out as known in the art. For instance the di-(monohydroxyaryl)alkanes can be re-esterified with carbonic acid diesters, e.g. dimethyl-, diethyl-, dipropyl-, dibutyl-, diamyl-, dioctyl-, dicyclohexyl-, diphenyl- and di-o,p-tolyl carbonate, at elevated temperatures from about 50 to about 320° C. and especially from about 120 to about 280° C.

The polycarbonates can also be produced by introducing phosgene into solutions of di-(monohydroxyaryl)-alkanes in organic bases, such as dimethylaniline, diethylaniline, trimethylamine and pyridine, or into solutions of di-(monohydroxyaryl)-alkanes in indifferent organic solvents, such as benzine, ligroine, cyclohexane, methylcyclohexane, benzene, toluene, xylene, chloroform, methylene chloride, carbon tetrachloride, trichloroethylene, dichloroethane, methylacetate and ethylacetate, with the addition of an acid-binding agent as mentioned above.

A process particularly suitable for producing polycarbonates consists in introducing phosgene into the aqueous solution or suspension of alkali metal salts such as lithium-, sodium-, potassium- and calcium salts of the di-(monohydroxyaryl)-alkanes, preferably in the presence of an excess of a base such as lithium-, sodium-, potassium- and calcium hydroxide- or carbonate. The polycarbonate precipitates out from the aqueous solution.

The conversion in the aqueous solution is promoted by the addition of indifferent solvents of the kind mentioned above which are capable of dissolving phosgene and eventually the produced polycarbonate.

The phosgene may be used in an equivalent amount. Generally however, it is preferable to use an excess of the phosgene.

Finally it is also possible to react the di-(monohydroxyaryl)-alkanes with about equimolecular amounts of bischloro carbonic acid esters of di-(monohydroxyaryl)-alkanes under corresponding conditions.

In the production of polycarbonates according to the various processes it is advantageous to employ small amounts of reducing agents, such as sodium- or potassium-sulphide, -sulphite and -dithionite or free phenol and p-tert.-butylphenol.

By adding monofunctional compounds which are capable of reacting with phosgene or with the endgroups of the polycarbonates consisting of the chlorocarbonic acid ester group and which terminate the chains, such as the phenols for instance the phenol, the tert.-butylphenol, the cyclohexylphenol, and 2,2-(4-hydroxyphenyl-4'-methoxyphenyl)-propane, further aniline and methylaniline, it is possible to regulate the molecular weight of the polycarbonates in wide limits.

The reaction of the di-(monohydroxyaryl)-alkanes with phosgene or of the chlorocarbonic esters of the di-(monohydroxyaryl)-alkanes may be carried out at room temperature or at lower or elevated temperatures, that is to say at temperatures from the freezing point to the boiling point of the mixture.

The polycarbonates produced according to the present invention are elastic thermoplastic materials whose softening point or melting point and physical properties greatly depend on the kind of the di-(monohydroxyaryl)-alkane used. They are soluble in a variety of organic solvents such as methylene chloride, chloroform and pyridine; some are also soluble in aromatic hydrocarbons, such as benzene, toluene, and o-, m- and p-xylene, or in esters, such as ethyl or butyl acetate, or in ketones, such as acetone and cyclohexanone, or in phenols, such as phenol and o-, m-, p-cresol, and can be worked up from solutions into shaped articles, such as films, fibres and the like, or into lacquer coatings. They melt without decomposition and can, therefore, be worked up into useful shaped articles or coatings by pressing, spraying, flame-spraying and the like.

Surprisingly, there can be obtained according to the present process, particularly when using 4,4'-di-(monohydroxyaryl)-alkanes, such as (4,4'-dihydroxy-diphenyl)-methane and 2,2-(4,4'-dihydroxy-diphenyl)-propane, crystallizable linear polycarbonates from which films, fibres and the like can be produced from the melt or solution and which can be oriented by stretching. The strength of these products is essentially increased by the stretching process whereas the elongation is thereby decreased.

The polycarbonates produced according to the present invention can also be processed in conjunction with plasticisers such as tricresyl phosphate, or fillers, such as asbestos, glass fibres, and the like.

Example 1

In a solution of 20 parts by weight of sodium hydroxide in 250 parts of water are suspended 57 parts by weight of 2,2-(4,4'-dihydroxy-diphenyl)-propane. A clear solution is formed. After the addition of 22 parts by weight of a mixture of xylene isomerides and 0.0026 part by weight of phenol, 6 parts by weight of phosgene are introduced into the solution at 30° C. with stirring and cooling. The mixture is then simultaneously treated with 31.5 parts by weight of phosgene and 21 parts by weight of sodium hydroxide in 62 parts of water in the course of 1½ hours. The mixture is subsequently stirred at 80° C. for 1 hour, the colourless granular product obtained is filtered off with suction and washed until neutral. The colourless product obtained melts at 225–227° C. into a highly viscous state. The K-value is 77, corresponding to a relative viscosity of 1.775, measured in m-cresol at 25° C. The product dissolves in solvents such as methylene chloride, chloroform, dimethyl-formamide and pyridine, forming highly viscous solutions. It can be worked up into shaped articles, such as films, fibres, injection mouldings, compression mouldings, from a solution or melt, and also in conjunction with plasticisers, such as tricresyl phosphate, and fillers, such as glass fibres, asbestos, and the like. The shaped articles, as, for example, films and fibres produced from a melt or solution can be oriented by stretching whereby shaped articles of great strength and low water absorption are obtained.

Example 2

In a solution of 41 parts by weight of sodium hydroxide in 312 parts of water are suspended 54.15 parts by weight of 2,2-(4,4'-dihydroxy-diphenyl)-propane and 3.35 parts by weight of 1,1-(4,4'-dihydroxy-diphenyl)-cyclohexane. 22 parts by weight of a mixture of xylene isomerides and 0.3 part by weight of sodium dithionite are added to this mixture and then there are introduced 37.5 parts by weight of phosgene at 30° C. within 105 minutes with stirring and cooling. The mixture is subsequently heated to 80° C. for 1 hour. The colourless product is disintegrated, washed and dried. A white powder having a K-value of 62, measured in m-cresol at 25° C., is obtained which corresponds to a relative viscosity of 1.475. The product melts at about 205° C., thereby forming a viscous melt. The shaped articles produced from solutions or melts excel in particularly high elasticity. They can be oriented by stretching. The product is particularly suited for working up from a melt.

Example 3

To a solution of 28.65 parts by weight of 1,1-(4,4'-dihydroxy-diphenyl)-cyclohexane in 35 parts by weight of absolute pyridine are added drop by drop 88.6 parts by weight of a 12.27% solution of phosgene in chloroform at about 0° C. within 1½ hours with stirring. After the addition of about two thirds of the phosgene solution, the reaction mixture is diluted with 150 parts by volume of methylene chloride. The reaction mixture, after dilution with the same volume of methylene chloride, is shaken out with water and dried. After evaporation of the solvent, there remains a hard, elastic, colourless mass having a softening point of 180° C. and a K-value of 40.2, measured in m-cresol at 25° C., corresponding to a relative viscosity of 1.21.

The polycarbonate forms a highly elastic, hard and strong film which renders it particularly suitable as a raw material for lacquers.

Example 4

To a solution of 43.63 parts by weight of 2,2-(4,4'-dihydroxy-3,3'-dimethyl-diphenyl)-propane in 63 parts by volume of absolute pyridine are added drop by drop 141.55 parts by weight of a 12.26% solution of phosgene in chloroform with stirring and cooling at 0° C. within 75 minutes. After the addition of two thirds of the phosgene solution, the reaction mixture is diluted with 235 parts by volume of absolute methylene chloride. The viscous solution obtained is again diluted with 400 parts by volume of methylene chloride and worked up as described in Example 3. The colourless elastic plastic material obtained melts at about 135° C. The K-value is 36.4, measured in m-cresol at 25° C., corresponding to a relative viscosity of 1.154. The plastic material is particularly suitable as raw material for lacquers on account of its good film-forming capacity, elasticity and hardness.

Example 5

To a solution of 256 parts by weight of 2,2-(4,4'-dihydroxydiphenyl)-pentane in 1640 parts by weight of a 10% caustic soda solution are added 500 parts by weight of benzene and, at an inner temperature of about 25° C., there are introduced 149 parts by weight of phosgene, with stirring, over a period of 3 hours. The phosgene is practically converted at once. The stirring of the mixture is continued for 1 hour and the mixture is then slowly heated to about 50° C. and kept at this temperature for 1 hour. The aqueous layer is then separated and the polycarbonate formed is diluted with benzene. The benzene solution, being cloudy due to emulsified water, is shaken out with dilute hydrochloric acid until neutral and azeotropically dehydrated. The dehydrated solution is filtered off and evaporated. A colourless, viscous, elastic plastic material is thus obtained which dissolves in benzene, toluene, ethyl and butyl acetate, forming clear solutions.

K-value: 42 (measured in m-cresol).
Softening point: 200–210° C.

The polycarbonate is particularly suitable as a lacquer raw material, for thermoplastic processing and for producing films from solutions or melts.

Example 6

Into a solution of 270 parts by weight of 2,2-(4,4'-dihydroxy-diphenyl)-4-methyl-pentane in 1640 parts by weight of a 10% caustic soda solution are introduced, after the addition of 200 parts by weight of benzene, 149 parts by weight of phosgene at an inside temperature of about 25° C. within 3 hours with stirring. The stirring is continued for 1 hour and the mixture is then heated to boiling for another hour. The aqueous layer, from which no further precipitate is thrown out on acidifying, is separated, the viscous paste is kneaded with water until the wash-water shows no further alkaline reaction, and the solvent is driven off in steam. A colourless, viscous, elastic plastic material is thus obtained, soluble in benzene, toluene, ethyl and butyl acetate, which is particularly suitable for thermoplastic processing, as raw material for lacquers and for the production of films.

K-value: 46
Softening point: 190–200° C.

Example 7

Into a solution of 284 parts by weight of 4,4-(4,4'-dihydroxy-diphenyl)-heptane in 1640 parts by weight of a 10% solution of caustic soda there are introduced, after the addition of 500 parts by weight of toluene, 149 parts by weight of phosgene at an inner temperature of 27° C., with stirring, over a period of 3 hours. The stirring is continued for 1 hour and the mixture is then heated to 70° C. for another hour. The further processing is carried out as described in Example 6. A colourless viscous plastic material is obtained, soluble in benzene, toluene, ethyl and butyl acetate as well as in acetone, which is particularly suitable for thermoplastic processing, as a raw material for lacquers, and for the production of films.

K-value: 38
Softening point: 205–215° C.

Example 8

Into a solution of 242 parts by weight of 2,2-(4,4'-dihydroxy-diphenyl)-butane in 1640 parts by weight of a 10% solution of caustic soda there are introduced with stirring, after the addition of 250 parts by weight of toluene, 149 parts by weight of phosgene at an inner temperature of 25° C. over a period of 2½ hours. The mixture is then heated to 40–45° C. for about 2 hours with stirring. The thinly-liquid polycarbonate formed thereby thickens until it reaches a paste-like consistency. After standing overnight at room temperature the aqueous layer is separated, the paste is kneaded with water until the wash-water shows no further alkaline reaction, and the toluene is driven off by steam. A colourless, viscous and elastic plastic material is thus obtained, dissolving in benzene, toluene and ethyl acetate to a clear solution which is particularly suitable for thermoplastic processing, as raw material for lacquers and for production of films.

K-value: 48.8
Softening point: 205–215° C.

Example 9

Into a solution of 290 parts by weight of 1,1-(4,4'-dihydroxy-diphenyl)-1-phenyl-ethane in 1640 parts by weight of a 10% solution of caustic soda there are introduced with stirring, after the addition of 250 parts by weight of benzene, 149 parts by weight of phosgene at an inner temperature of about 25° C. After stirring for another hour, the mixture is heated to 70° C. for 1 hour and worked up as described in Example 6. A colourless, viscous and elastic plastic material, soluble in benzene, toluene, methylene chloride and chloroform to a clear solution, is obtained which is particularly suitable for thermoplastic processing and producing films.

K-value: 47
Softening point: 210–220° C.

Example 10

To a solution of 1.77 parts by weight of the bis-chlorocarbonic acid ester of 2,2-(4,4'-dihydroxy-diphenyl)-propane in 120 parts by weight of absolute methylene chloride there is added drop by drop with stirring a solution of 7.60 parts by weight of 2,2-(4,4'-dihydroxy-diphenyl)-propane in 10.5 parts by weight of absolute pyridine and 120 parts by weight of absolute methylene chloride at 0° C. over a period of 60 minutes. After the mixture is stirred at room temperature for several hours, it is worked up as described in Example 3. After evaporation of the solvent, there remains an elastic and colourless plastic material.

K-value: 36.5 (measured in m-cresol at 25° C.)
Softening point: 220–222° C.

Example 11

Into a solution of 270 parts by weight of 1,1-(2,2'-dihydroxy-4,4'-dimethyl-diphenyl)-butane in 1640 parts by weight of a 10% solution of caustic soda there are introduced with stirring, after the addition of 500 parts by weight of white spirit (boiling point 60–70° C.), 149 parts by weight of phosgene at about 25° C. Then the mixture is heated to the boiling point for one hour. After standing over night at room temperature further 750 parts by weight of white spirit are added. The aqueous layer is separated. The last amounts of the reaction product still solved herein, are extracted by methylene chloride. The united organic solutions are then neutralised by diluted hydrochloric acid, dried by sodium sulfate, filtrated and concentrated by evaporation. The rests of volatile components are removed by heating in vacuo (2 hours at 120° C. under 15 mms. mercury gauge, 2 hours under 0.2 mm. mercury gauge). A yellowish spritting resin (softening point 115° C.) is obtained, dissolving in petrol, benzene, toluene, ethylacetate, butylacetate and acetone. It is particularly suitable as a raw material for lacquers.

Example 12

Into a mixture of 137.6 parts by weight of 2,2-(4,4'-dihydroxy-diphenyl)-propane, 66.8 parts by weight of caustic soda, 615 parts of water, 330 parts by weight of methylene chloride, 0.12 part by weight of sodium dithionite and 1.0 part by weight of p-tert.-butylphenol, 71.5 parts by weight of prosgene are introduced with stirring at about 25° C. during 2 hours. The stirring of the mixture at room temperature is continued for about 4 hours. After this time, the mixture is high viscous. After washing the mixture with water and evaporating the solvent a colourless, elastic plastic is obtained. The K-value is 63.0 corresponding to an average molecular weight of 45,000. The theoretical average molecular weight is 47,700.

Example 13

Into a mixture of 110 parts by weight of 2,2-(3,5-3',5'-tetrachloro-4,4'-dihydroxy-diphenyl)-propane, 33.4 parts by weight of caustic soda, 310 parts of water, 165 parts by weight of methylene chloride and 0.06 part by weight of sodium dithionite, 35.8 parts by weight of phosgene are introduced with stirring at about 25° C. during 2 hours. The stirring of the mixture at room temperature is continued for 5 hours. The mixture is then high viscous. It is washed with water till no electrolytes are present. After evaporating the solvent there remains a colourless, clear, tough plastic of the softening point of 190–195° C. and of the K-value of 43.0.

Example 14

Into a mixture of 130.7 parts by weight of 2,2-(4,4'-dihydroxy-diphenyl)-propane, 6.0 parts by weight of 4,4'-dihydroxy-diphenyl-methane, 66.8 parts by weight of caustic soda, 615 parts of water, 330 parts by weight of methylene chloride and 0.12 part by weight of sodium dithionite, 71.5 parts by weight of phosgene are introduced with stirring at about 25° C. during 2 hours. The stirring is continued at room temperature for about 4 hours. After this time the solution of the polycarbonate in methylene chloride is high viscous. The aqueous layer is separated and the solution of the polycarbonate is washed with water. After evaporating the solvent there remains a colourless, clear, tough plastic of the K-value of 72.2 and a softening point of 220–223° C. Films produced from a solution of the polycarbonate in methylene chloride have especially good physical properties.

*Example 15*

Into a mixture of 161.5 parts by weight of 1,1-(4,4'-dihydroxy-diphenyl)-cyclohexane, 66.8 parts by weight of caustic soda, 615 parts of water, 330 parts by weight of methylene chloride and 0.12 part by weight of sodium dithionite, 71.5 parts by weight of prosgene are introduced with stirring at about 25° C. during 2 hours. The stirring is continued for 5 hours at room temperature. After this time the organic solution is high viscous. The aqueous layer is separated and the organic solution is washed with water. After evaporating the solvent there remains a colourless clear, tough plastic of the K-value of 42.6 and of the softening point of 180° C.

Films produced from a solution of this polycarbonate in methylene chloride have high mechanical strength and a very high flexibility.

We claim:

1. A high molecular weight, thermoplastic polycarbonate having a melting point of at least about 135° C., said polycarbonate consisting essentially of recurring units of this formula:

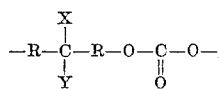

wherein each —R— is selected from the group consisting of phenylene, halo substituted phenylene and alkyl substituted phenylene, and X and Y are each selected from the group consisting of hydrogen, hydrocarbon radicals free from aliphatic unsaturation and of radicals which together and with the adjoining

atom form a cycloalkane radical, the total number of carbon atoms in X and Y being up to 12.

2. The polycarbonate of claim 1 wherein —R— is phenylene and X and Y are hydrogen.
3. The polycarbonate of claim 1 wherein —R— is phenylene and X and Y are methyl.
4. The polycarbonate of claim 1 wherein —R— is phenylene, X is methyl and Y is ethyl.
5. The polycarbonate of claim 1 wherein —R— is phenylene, X is methyl and Y is propyl.
6. The polycarbonate of claim 1 wherein —R— is phenylene and X and Y together and with the adjoining

atom form the cyclohexylidene radical.

7. The polycarbonate of claim 1 wherein —R— is phenylene, X and Y are each methyl in a substantial number of said recurring units and X and Y are each hydrogen in the remainder of said recurring units.
8. The polycarbonate of claim 1 wherein —R— is 3,5-dichlorophenylene and X and Y are methyl.
9. The polycarbonate of claim 1 wherein —R— is 3-methylphenylene and X and Y are methyl.
10. The polycarbonate of claim 1 wherein —R— is 4-methylphenylene, X is hydrogen and Y is propyl.
11. The polycarbonate of claim 1 wherein —R— is phenylene, X is phenyl and Y is methyl.
12. The polycarbonate of claim 1 wherein —R— is phenylene, X and Y are each methyl in a substantial number of said recurring units and X and Y together and with the adjoining

atom form the cyclohexylidene radical in the remainder of said recurring units.

13. The process for the manufacture of thermoplastic polycarbonates, which comprises reacting, in the presence of an acid binding agent, substantially equimolar proportions of a compound of the formula

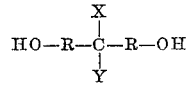

wherein each —R— is selected from the group consisting of phenylene, halo substituted phenylene and alkyl substituted phenylene, and X and Y are each selected from the group consisting of hydrogen, hydrocarbon radicals free from aliphatic unsaturation and of radicals which together and with the adjoining

atom form a cycloalkane radical, the total number of carbon atoms in X and Y being up to 12, with a derivative of carbonic acid selected from the group consisting of phosgene and bis-chlorocarbonic acid esters of said formula, until a high molecular weight, thermoplastic polycarbonate is produced.

14. The process according to claim 13 wherein the reaction is carried out in the presence of an organic solvent for at least one of said reactants.
15. The process according to claim 14 wherein the organic solvent is methylene chloride.
16. The process according to claim 13 wherein the reaction is carried out in the presence of water.
17. The process according to claim 13 wherein the reaction is carried out in the presence of a mixture of water and an organic solvent for at least one of said reactants.
18. The process according to claim 13 wherein the acid binding agent is an organic base.
19. The process according to claim 18 wherein the organic base is pyridine.
20. The process according to claim 13 wherein the acid binding agent is an alkali metal hydroxide.
21. The process according to claim 13 wherein the acid binding agent is a strong base.
22. The process according to claim 13 wherein the reaction is carried out in the presence of a reducing agent selected from the group consisting of alkali metal sulphide, alkali metal sulphite, alkali metal dithionite, phenol and tertiary butyl phenol.
23. The process according to claim 13 wherein a reactive monofunctional compound for regulating chain length is added.
24. The process according to claim 13 wherein the compound of the formula is di-(monohydroxyphenyl)-methane.
25. The process according to claim 13 wherein the compound of the formula is 4,4'-dihydroxydiphenyl-methane.
26. The process according to claim 13 wherein the compound of the formula is 2,2-(4,4'-dihydroxydiphenyl)-propane.
27. The process according to claim 13 wherein the compound of the formula is 1,1-(4,4'-dihydroxydiphenyl)-cyclohexane.
28. The process according to claim 13, wherein the compound of the formula is a mixture of 2,2-(4,4'-dihydroxydiphenyl)-propane and 1,1-(4,4'-dihydroxydiphenyl)-cyclohexane.
29. The process according to claim 13, wherein the compound of the formula is 2,2-(3,3',5,5'-tetrachloro-4,4'-dihydroxydiphenyl)-propane.
30. The process for the manufacture of thermoplastic polycarbonates, which comprises reacting, in the presence of an acid binding agent, substantially equimolecular proportions of a di-(monohydroxy monocyclic aryl) aliphatic hydrocarbon in which each said monohydroxy monocyclic aryl substituent is attached to the same carbon atom of said aliphatic hydrocarbon moiety, with a derivative of carbonic acid selected from the group consisting of phosgene and bis-chlorocarbonic acid esters of such a di-(monohydroxy monocyclic aryl) aliphatic hydrocarbon, until a high molecular weight thermoplastic polycarbonate is produced.

31. The process according to claim 30 wherein said substituted aliphatic hydrocarbon reactant is 1,1-(4,4'-dihydroxydiphenyl)-cyclohexane.

32. The process according to claim 30 wherein said substituted aliphatic hydrocarbon reactant is 1,1-(4,4'-dihydroxydiphenyl)-1-phenyl-ethane.

33. The process according to claim 30 wherein said substituted aliphatic hydrocarbon reactant is 2,2-(3,3',5,5'-tetrachloro-4,4'-dihydroxydiphenyl)-propane.

34. The process according to claim 30 wherein the reaction is carried out in the presence of a solvent for at least one of said reactants.

35. The process according to claim 30 wherein the di-(monohydroxy monocyclic aryl) aliphatic hydrocarbon is in the form of its alkali metal salt.

36. The process for the manufacture of thermoplastic polycarbonates, which comprises reacting substantially equimolar proportions of an alkali metal salt of 2,2-(4,4'-dihydroxydiphenyl)-propane and phosgene in the presence of water and an inert organic solvent for phosgene and the resulting product, until a high molecular weight, thermoplastic polycarbonate is obtained.

37. The process of claim 36 wherein said solvent is methylene chloride.

38. The process for the manufacture of thermoplastic polycarbonates, which comprises reacting substantially equimolar proportions of 2,2-(4,4'-dihydroxydiphenyl)-propane and phosgene in the presence of pyridine and an inert organic solvent for phosgene and the resulting product, until a high molecular weight, thermoplastic polycarbonate is obtained.

39. The process for the manufacture of thermoplastic polycarbonates, which comprises reacting substantially equimolar proportions of a mixture of alkali metal salts of 2,2-(4,4'-dihydroxydiphenyl)-propane and 1,1-(4,4'-dihydroxydiphenyl)-cyclohexane and phosgene in the presence of water and an inert organic solvent for phosgene and the resulting product, until a high molecular weight, thermoplastic polycarbonate is obtained.

40. A stretchable, orientable, high tensile strength textile fiber of a high molecular weight polycarbonate which consists essentially of recurring units of the formula:

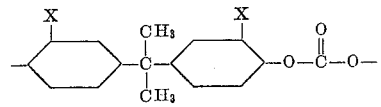

wherein X is selected from the group consisting of hydrogen and methyl.

References Cited in the file of this patent

UNITED STATES PATENTS

| | | |
|---|---|---|
| 2,035,578 | Wagner | Mar. 31, 1936 |
| 2,058,394 | Arvin | Oct. 27, 1936 |
| 2,210,817 | Peterson | Aug. 6, 1940 |
| 2,370,568 | Muskat et al. | Feb. 27, 1945 |
| 2,455,652 | Bralley et al. | Dec. 7, 1948 |
| 2,455,653 | Bralley et al. | Dec. 7, 1948 |
| 2,517,965 | Bohl | Aug. 8, 1950 |
| 2,536,989 | Von Glahn | Jan. 2, 1951 |
| 2,587,437 | Bralley et al. | Feb. 26, 1952 |
| 2,595,343 | Drewitt | May 6, 1952 |
| 2,743,258 | Coover | Apr. 24, 1956 |

OTHER REFERENCES

Einhorn: "Annalen der Chemie," vol. 300, pages 135–179 (pages 152–154 of particular interest). (Copy in Scientific Library.)

UNITED STATES PATENT OFFICE
CERTIFICATE OF CORRECTION

Patent No. 3,028,365                                April 3, 1962

Hermann Schnell et al.

It is hereby certified that error appears in the above numbered patent requiring correction and that the said Letters Patent should read as corrected below.

Column 1, line 47, for "(4,4'-dihydroxy-diphenyl)-" read -- 4,4'-dihydroxy-diphenyl- --; line 53, for "1,1'-" read -- 1,1- --; column 2, line 4, for "(3,3'-dichloro-4,4'-dihydroxy-diphenyl)-" read -- 3,3'-dichloro-4,4'-dihydroxy-diphenyl- --; lines 8 and 9, for "(4,4'-dihydroxy-diphenyl)-" read -- 4,4'-dihydroxy-diphenyl- --; column 3, line 22, for "(4,4'-dihydroxy-diphenyl)-" read -- 4,4'-dihydroxy-diphenyl- --; column 6, line 11, for "36.5" read -- 36.4 --; line 31, for "spritting" read -- brittle --; same column 6, line 42, and column 7, line 13, for "prosgene", each occurrence, read -- phosgene --; same column 7, line 16, for "high" read -- highly --; line 28, for "this" read -- the --.

Signed and sealed this 19th day of February 1963.

(SEAL)
Attest:

ESTON G. JOHNSON                              DAVID L. LADD

Attesting Officer                                  Commissioner of Patents